Figure 4:
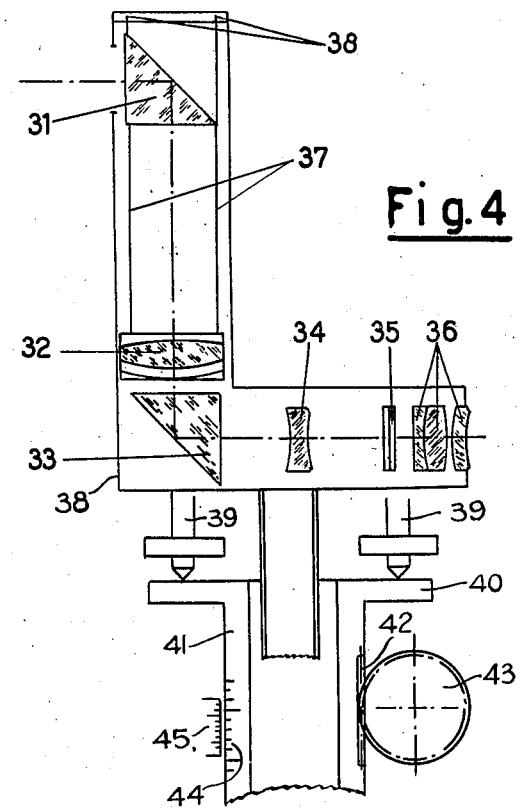

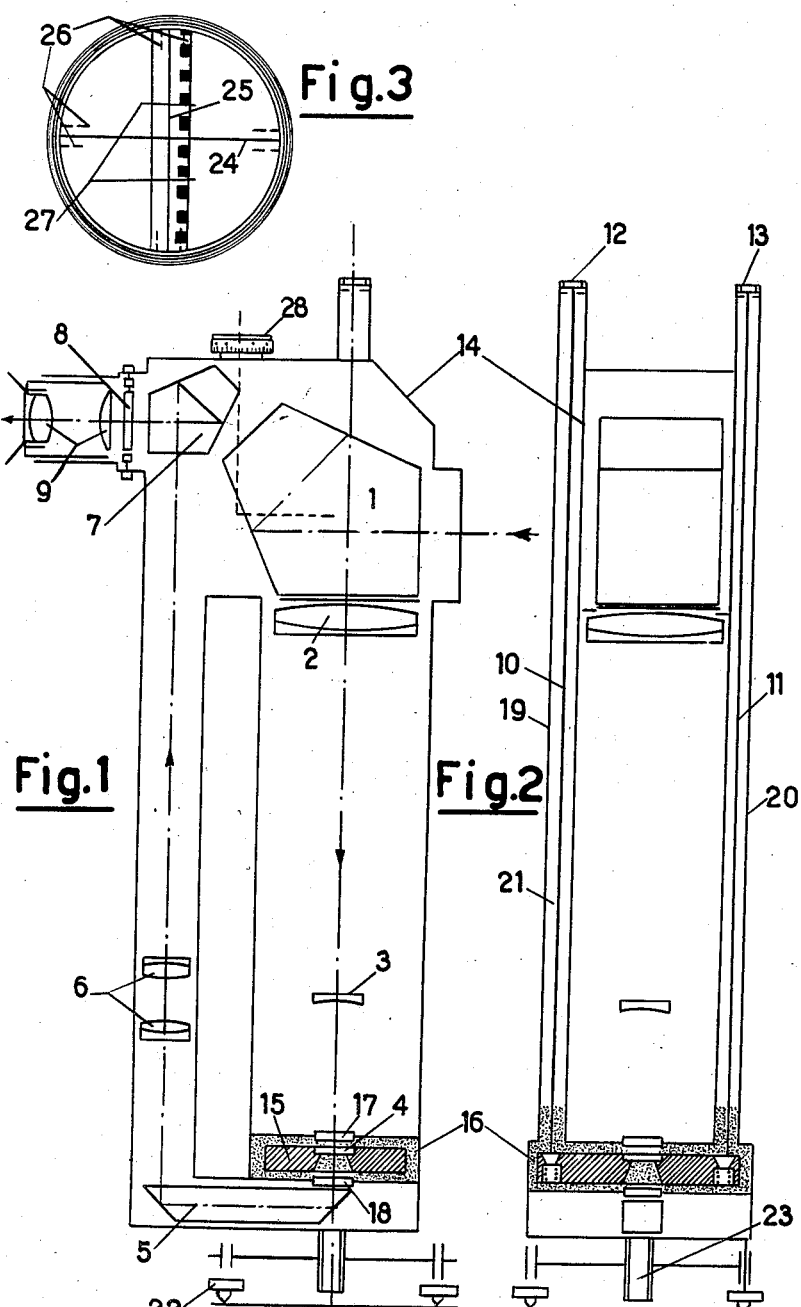

United States Patent Office 2,890,616
Patented June 16, 1959

2,890,616

DUMPY LEVEL WITH AUTOMATIC DEVICE FOR THE HORIZONTAL SETTING OF THE AXIS OF COLLIMATION

Raffaello Bruscaglioni, Milan, Italy, assignor to Filotecnica Salmoiraghi S.p.A., Milan, Italy, an Italian company Application April 2, 1954, Serial No. 420,630

Claims priority, application Italy April 8, 1953

8 Claims. (Cl. 88—2.3)

The present invention relates to a dumpy level constituted in such a manner that if the telescope is arranged roughly horizontal, the axis of collimation assumes automatically a strictly horizontal position, or a position having a constant slope with respect to the horizontal plane. In particular, the invention finds application with telescopes of constant length with internal focussing lens.

One of the characteristics of the level is constituted by the fact that the optical axis of the main part of the telescope (the objective) is placed substantially vertical and that the return to the horizontal is obtained by means of the pendular suspension of the reticle the objective being fixed or of the objective or part of it the reticle being fixed.

Another characteristic is that in the optical system of the telescope, the center of the objective and the intersection of the two perpendicular hairs of the reticle always determine a vertical axis or an axis with a constant slope to the vertical even if the telescope body inclines, within restricted limits, in respect of said vertical.

Further characteristics will be better understood from the following description, without limitation, of some preferred embodiments thereof, with reference to the accompanying drawings, wherein Figs. 1 and 2 represent respectively a section in the vertical plane of collimation and a cross-section of the instrument in which the reticle is suspended and the objective is fixed, and Fig. 3 shows the appearance of the field in the eyepiece.

Fig. 4 shows a section of the instrument in which the reticle is fixed and the objective suspended.

In Figs. 1 and 2, the optical system of the telescope is composed as follows, proceeding in the sense of light: the pentagonal prism 1 placed above the objective 2, the mobile lens 3 for focussing, the reticle 4 where a first plane of formation of images is provided, a transmission prism 5, the double auxiliary objective 6, a second pentagonal prism 7, the reticle 8 where a second plane of formation of images is provided and, at last, the eyepiece 9.

The optical axis—as can be seen in Fig. 2—is bent four times in the same plane in such a manner as to enter and to leave horizontally, while the main axis comprised between the objective 2 and the reticle 4 is vertical. This arrangement is very advantageous because it makes pendular suspension of the reticle 4 possible.

The reticle 4, which has an orthogonal cross of hairs, is supported by two or more thin wires 10, 11 parallel and anchored at the two points 12, 13 of the framing 14. It can be realized from the drawings that whenever the mechanical axis of the level is displaced from the vertical direction, both the image of the reticle and that of the levelling staff are displaced. In order to ensure that such displacements are equal to each other, that is, to maintain the reticle still with respect to the image of the staff, the length of the supporting wires 10 and 11 is to be calculated in such a way as to obtain a suspension which is the equivalent of a pendular suspension having a length equivalent to the focal length of the optical objective system. Every one of the suspension wires is to be considered as a beam, the opposite ends of which are rigidly fixed to a point of the apparatus and to the movable frame carrying the reticle, respectively. When the reticle-carrying frame is displaced, the plane containing the reticle is displaced in a direction parallel to the plane containing the points in which the wires are fixed to said frame. The bending line of each wire, as a consequence of its being like a fixed beam, has a turning point halfway between its ends.

In order to simplify the calculation, and due to the symmetry of the system, it is sufficient to consider a wire having half the length of the actual wire and the upper end of which is rigidly fixed and to the lower end of which a load P is applied.

Should the tangent to the bending line at the turning point form a small angle $\alpha$ with the direction of the line of action of gravity, the corresponding displacement $e$ of the reticle carrying frame is:

$$e = \alpha l - 2Y$$

where $l$ is the length of the wire and $Y$ is the ordinate of the bending line, taken at the middle point of the wire.

$\alpha$ is small and the arc of amplitude $\alpha$ can be identified with its tangent.

$f$ is the focal length of a lens equivalent to the optical system mounted before the reticle. Therefore, in order to ensure that the image will be still with respect to the reticle, it should be:

$$e = f\alpha$$

Hence $$f\alpha = \alpha l - 2Y$$

and $$l = f + \frac{2Y}{\alpha}$$

Let us now write the equation which expresses the relationship between the bending moments and the curvature of the points on the bending line. Due to the small value of $\alpha$, it is possible to equate the segment $Y - y$ ($y$ is a generic ordinate and $Y$ is the maximum ordinate of the bending line) to the lever arm of the force P:

$$P(y - Y) = -\frac{d^2y}{dx^2}EJ$$

E is the Young's modulus and J the moment of inertia of the cross-section(s) of the suspension wires. The equation is integrated and, taking into account that when $x = 0$ $$\frac{dy}{dx} = \alpha \text{ and } y = 0$$

X being the abscissa corresponding to the maximum ordinate Y, it results:

$$Y = \alpha \sqrt{\frac{EJ}{P}} \cdot \left[ \frac{e^{2X\sqrt{\frac{P}{EJ}}} - 1}{e^{2X\sqrt{\frac{P}{EJ}}} + 1} \right]$$

In practice the exponent $$2X\sqrt{\frac{P}{EJ}}$$

is an integer greater than 4÷5 so that the expression in square brackets can be considered practically equal to 1; the expression giving Y can be therefore simplified, thus:

$$Y = \alpha \sqrt{\frac{EJ}{P}}$$

Let us now substitute for Y its value in the formula giving the length of the wire:

$$l = f + 2\sqrt{\frac{EJ}{P}}$$

If the number of wires be $n$, the load P should be obviously considered as uniformly distributed among them, thus $$l = f + 2\sqrt{\frac{EJn}{P}}$$

This formula not only indicates the length the wires must have to ensure that the image remains still with respect to the reticle, but also states that this length is constant and independent of the angle $\alpha$.

The reticle 4 is housed in a heavy plate 15, which imparts to the wires the vertical directive force. Said plate is free to oscillate within a chamber 16 which is closed hermetically by suitable glass planes 17, 18, which allow passage of light and is in communication with the pipes 19, 20, wherein there are enclosed the wires 10, 11. The chamber 16 and the pipes 19, 20 may be filled with a transparent liquid 21 in order to dampen oscillations; instead of a liquid, however, suitable aerodynamical brakes may be used for dampening.

Fig. 3 shows the appearance of sight through the eyepiece of the instrument. There will be seen, besides the image of the sight, the horizontal hair 24 and the veritcal hair 25, carried by the reticle 4 suspended pendularly, the double vertical and horizontal lines 26 and the distance hairs 27, all fixed on the reticle 8. The lines 26 serve to confine the area of safe and free operation of the pendular device; the whole of the hairs fixed on the reticle 8 serves for the observer to check and ensure that the hair 24 has assumed its rest position.

For use, after placing the instrument in approximately vertical position, one looks into the eyepiece and with the aid of the screws 22 one brings the hairs 24, 25 of the reticle 4 to be comprised in the areas respectively confined by the couples of vertical and horizontal lines 26. This operation, which corresponds to the centering of a spherical level, is performed rapidly. Thereafter, the telescope is directed to the sight, the internal lens is displaced to obtain the clear and distinct vision of the sight, and reading is performed. The level according to the present invention moreover offers the possibility of checking the operation of the pendular device as follows: by acting upon the horizontal screw nearest to the direction of sighting, the telescope is slightly inclined: the reading on the sight shall remain unvaried.

The pentagonal prism 1 may be mounted rotatable about a horizontal cross-axis by means of the knob 28 provided with a graduated drum, or it may be mechanically displaced; it is also possible to translate the whole instrument both in the case of suspension of the objective, as it is shown in Fig. 4, or in the case of suspension of the reticle, substituting therefore in every case the planeparallel lamina used in the precision levels.

Fig. 4 shows another embodiment of the invention in which the reticle is made fixed and the objective mobile. In this case the optical system of the telescope, proceeding in the direction of the light, is constituted as follows: prism 31 which bends the optical axis of 90°, objective 32 suspended by wires 37 to the connection points 38, transmission prism 33 which bends the optical axis of 90°, mobile focussing lens 34, fixed reticle 35 where the image is formed and finally eyepiece 36. Further, it will be seen that the frame or housing 38 containing the above described optical system is provided with spaced apart legs 39, in the form of screws, which rest on a base 40 and are adjustable to provide the initial rough adjustment of the level, as described in connection with the screws 22 of the embodiment of Figs. 1 and 2. The base 40 has a depending extension 41 formed with a gear rack 42 therealong which meshes with a rotatably mounted gear 43, so that turning of the gear 43 effects substantially vertical movement of housing 38 for displacing the line of sight of the level so as to allow reading of fractional graduations on a sighted staff. A vernier scale 44 is formed on the depending portion 41 of base 40 and co-operates with a fixed vernier index 45 to permit accurate reading of the displacement of the line of sight. The operation and use characteristics of the telescope above described are closely similar to those already stated for the previous telescope. Of course, also in this case of Fig. 4, the measures of the previous case can be adopted for the oscillation dampening, the wire length and the relative adjustments.

It should be understood that other embodiments of the invention are possible within the scope of the invention.

What I claim is:

1. A level comprising light transmission means defining an optical axis having a substantially horizontal portion and a substantially vertical portion, an objective system and a reticle extending across said substantially vertical portion of the optical axis with said objective system forming an image upon said reticle, and with said light transmission means, objective system and reticle forming optical parts in the level, an eye piece system for sighting the reticle and the image formed on the latter, the reticle and at least an element of the objective system being arranged for displacement with respect to each other in a direction substantially perpendicular to said substantially vertical portion of the optical axis by means of substantially rigid but resiliently bendable suspension organs which are fixedly anchored at one end and fixedly secured to the suspended optical part at the other end, the length of said suspension organs being defined by the formula $$l = f + 2\sqrt{\frac{EJn}{P}}$$

in which $l$ is the length of said suspension organs, $f$ is the focal length of a lens equivalent to the objective system, E is the Young's modulus of the material constituting the suspension organs, J is the moment of inertia of the cross-sections of the suspension organs, P is the weight of the suspended optical part, and $n$ is the number of the suspension organs.

2. A level according to claim 1; wherein the reticle is borne by the suspension organs and the other optical parts are fixed.

3. A level according to claim 1; wherein the reticle is fixed and the objective is borne by the suspension organs.

4. A level according to claim 1; wherein the eyepiece system carries a fixed reticle on which the image of the moving reticle is formed, in order to allow the rapid checking of the correct posture of the level.

5. A level according to claim 1; wherein the light transmission means includes an optical square giving two reflections and placed before the objective, said optical square being rotatable about a horizontal axis for displacing the line of sight so as to allow reading of the fractions of graduation on the sighted staff.

6. A level according to claim 1; wherein the light transmission means includes an optical square giving two reflections and placed before the objective, said optical square being vertically movable for displacing the line of sight so as to allow reading of the fractions of graduation on the sighted staff.

7. A level comprising a housing, light transmission means in said housing defining an optical axis having a substantially horizontal portion and a substantially vertical portion, an objective system and a reticle extending across said substantially vertical portion of the optical axis with said objective system forming an image on said reticle, and with said light transmission means, objective system and reticle forming optical parts in the level, an eyepiece system carried by said housing for sighting the reticle and the image formed on the latter, the reticle and at least an element of said objective system being relatively displaceable in a direction substantially perpendicular to said substantially vertical portion of the optical axis by means of substantially rigid but resiliently bendable suspension organs which are fixedly anchored, at one end, to said housing and fixedly secured, at the other end, to the suspended optical part, the length of said suspension organs being defined by the formula $$l = f + 2\sqrt{\frac{EJn}{P}}$$

in which $l$ is the length of said suspension organs, $f$ is the focal length of a lens equivalent to the objective system, E is the Young's modulus of the material constituting the suspension organs, J is the moment of inertia of the cross-sections of the suspension organs, P is the weight of the suspended optical part, and $n$ is the number of the suspension organs, for ensuring that the mechanical movement of the suspended optical part resulting from any divergence of said substantially vertical portion of the optical axis from the true vertical compensates for the displacement of the image of the observed object, thus achieving immobility of the image with respect to said reticle and also the immobility of the line of sight, and mechanical means operative to vertically move said housing for displacing the line of sight of the level so as to allow reading of fractional graduations on a sighted staff.

8. A level comprising light transmission means defining an optical axis having a substantially horizontal portion and a substantially vertical portion, an objective system and a reticle forming optical parts in the level, one of said optical parts extending across said substantially vertical portion of the optical axis with said objective system forming an image upon said reticle, an eyepiece system for sighting said reticle and the image formed on said reticle, the reticle and at least an element of the objective system being arranged for displacement with respect to each other in a direction substantially perpendicular to said substantially vertical portion of the optical axis by means of substantially rigid but resiliently bendable suspension organs which are fixedly anchored at one end and fixedly secured to the suspended optical part at the other end, the length of said suspension organs being defined by the formula $$l \parallel f + 2\sqrt{\frac{EJn}{P}}$$

in which $l$ is the length of said suspension organs, $f$ is the focal length of a lens equivalent to the objective system, E is the Young's modulus of the material constituting the suspension organs, J is the moment of inertia of the cross-sections of the suspension organs, P is the weight of the suspended body, and $n$ is the number of the suspension organs.

References Cited in the file of this patent

UNITED STATES PATENTS

| | | |
|---|---|---|
| 928,477 | Sloggett | July 20, 1909 |
| 973,062 | Mayo | Oct. 18, 1910 |
| 989,852 | Koscinski | Apr. 18, 1911 |
| 1,016,562 | Griffith | Feb. 6, 1912 |
| 1,448,289 | French | Mar. 13, 1923 |
| 1,722,209 | Gordon | July 23, 1929 |
| 2,266,741 | Crane et al. | Dec. 23, 1941 |
| 2,633,050 | Baker | Mar. 31, 1953 |
| 2,660,916 | Zobel et al. | Dec. 1, 1953 |
| 2,679,181 | Keuffel et al. | May 25, 1954 |
| 2,779,231 | Drodofsky | Jan. 29, 1957 |

FOREIGN PATENTS

| | | |
|---|---|---|
| 276,929 | Germany | July 23, 1941 |
| 470,629 | Italy | Apr. 16, 1952 |